United States Patent [19]

Huebner

[11] 3,798,608

[45] Mar. 19, 1974

[54] DIGITAL SIGNAL TRANSMISSION APPARATUS

[75] Inventor: Thomas W. Huebner, New Berlin, Wis.

[73] Assignee: Johnson Service Company, Milwaukee, Wis.

[22] Filed: Dec. 15, 1972

[21] Appl. No.: 315,464

[52] U.S. Cl. ................ 340/172.5, 178/68, 307/269, 307/282

[51] Int. Cl. ............................................ H03k 5/00

[58] Field of Search ........... 307/208, 261, 268, 269, 307/282, 289, 106; 328/34, 63, 72, 74; 340/172.5

[56] References Cited

UNITED STATES PATENTS

| | | | |
|---|---|---|---|
| 3,104,331 | 9/1963 | Zinke | 328/34 |
| 3,153,200 | 10/1964 | Wahrman et al. | 328/34 |
| 3,161,830 | 12/1964 | Frysinger | 328/34 |
| 3,183,372 | 5/1965 | Chin | 328/74 |
| 3,497,724 | 2/1970 | Harper | 307/261 |
| 3,538,342 | 11/1970 | Jensen et al. | 307/106 |
| 3,557,308 | 1/1971 | Alexander | 328/72 |
| 3,187,260 | 6/1965 | Dove | 178/68 |

*Primary Examiner*—Paul J. Henon
*Assistant Examiner*—Michael Sachs
*Attorney, Agent, or Firm*—Andrus, Sceales, Starke & Sawall

[57] ABSTRACT

A bi-polar data signal of a nominal period is transmitted over a loop cable to a plurality of series connected remote stations, each of which includes means to process the bit. Each bit signal is divided into a plurality of three successive intervals. During each of the first two periods, the one polarity pulse signal occurs on one line followed by an opposite polarity pulse on the line. A negative and positive signal detector generates a pair of corresponding pulses. The first pulse fires a timing means to generate a short pre-clock pulse employed as a timing pulse in the processing of the data bit signal. The trailing edge of the pre-clock pulse fires clock timing means having a longer timing period. The output of the clock timing means is connected to the pre-clock means and to the receiving means to inhibit further signal formation. A clock pulse is derived even if one of the data polarity pulse is lost to continue proper transmission of the successive bits of a message frame even if the data bit is transmitted with erroneous information. The processing circuitry further includes a parity check on the received data to indicate such a fault.

17 Claims, 2 Drawing Figures

DIGITAL SIGNAL TRANSMISSION APPARATUS

BACKGROUND OF THE INVENTION

This invention relates to a digital data clock signal generating apparatus and in particular to means for receiving of digital information in a communication system.

Digital logic signals are advantageously employed in the transmission of information or data from one point to a remote point in connection with automated control and communication systems and the like. Generally information can be reliably transmitted over relatively long transmission lines of a twisted line pair or coaxial cable by selective transmission of digital logic level voltage signal or the like. The proper detection of the successive digital signals produces a coded information transfer. For example, a loop communication is disclosed in the copending application of Buchanan et al., entitled "DATA COMMUNICATION SYSTEM EMPLOYING A SERIES LOOP" bearing Ser. No. 315,567 which was filed on the same day as this application and which is assigned to the same assignee. The information may be advantageously transmitted as balanced bi-polar differential signals. In such a system, one line of the pair is inductively driven between two voltage levels from a single power supply. Each data bit is conveniently transmitted as a bi-polar or alternating pulse signal. A logic 1 is defined by the bi-polar pulse signal including an initial positive pulse followed by a negative pulse on the transmission line. Similarly, a logic 0, by convention, is defined when the signal first includes a negative pulse followed by a positive pulse. The data transmitter, particularly for high speed data transmission, can conveniently and practically consist of a pair of identical bit transmitting transistor units, each of which includes a transistor and a differentiating network to pulse a dual-winding, series connected phase coupling transformer. A single output winding is provided and coupled through a relatively low impedance transmission line to a receiver at the receiving station. The receiver similarly includes a coupling transformer with an output winding connected to positive and negative pulse detectors or comparators to generate corresponding logic data signals. However, only the first pulse may be used as the operative data pulse.

Although such systems are employed, they require relatively expensive and special purpose integrated circuitry as line drivers to provide the necessary power level at the transmitting end and similarly receivers with special synchronizing means at the receiving end. In such digital systems it is, of course, important to continuously monitor the transmission of the digital information to ensure error free detection with necessary correction where required. Such systems have generally been limited to transmission of data information at a rate of 50,000 bits per second to minimize the difficulty of monitoring the data transmission, although the digital bits can be readily generated and transmitted at rates of the order of 500,000 to 10,000,000 bits per second, the system is extremely dependent on clock pulses synchronized at the transmitting and receiving ends of the transmission system. Some transmission systems include means to detect an error in a message with a resulting retransmission of total data. The retransmission, however, results in a delay of the transmission of subsequent information until the first has been checked with loss in overall operating system speed. Other detection systems include continuously scanning similar samples to permit the making of a weighted decision regarding the validity of the information based on a number of similar samples which are checked or analyzed to ensure the validity of transmission.

Where the transmission rate is in excess of 50,000 bits per second, the monitoring systems are extremely dependent upon proper clock synchronization at the transmitting and receiving end of the systems. Although the prior art has suggested use of digital information with internal clock data, the systems are generally difficult to operatively control and, of course, the loss of a clock pulse can result in the loss of data. Further, the system requires relatively expensive circuitry to provide completely satisfactory operation.

The digital transmission art includes a need for a reliable, self-generating clock means for digital data and particularly such a means which may also generate related timing and control pulses to ensure reliable and continuous transmission of data.

SUMMARY OF THE PRESENT INVENTION

The present invention is therefore particularly directed to a bi-polar transmitted data signal with a special recovery means for ensuring reliable recovery of the digital data information and particularly the self-generating of clock and related signals to properly analyze and validate each data bit and properly retransmit the data.

Generally, in accordance with the present invention, each bi-polar pulse signal has a corresponding nominal time period or interval and defines a message logic bit. Each bit is divided into a plurality of three successive intervals. During each of the first two periods, the one polarity pulse signal occurs on one line of the transmission cable, followed by an opposite polarity pulse. For example, in a practical system the pulse signals may include a total time of two microseconds per data bit with the initial polarity pulse being generated with five-tenths of a microsecond interval followed by a similar opposite polarity pulse, followed by a quiet period of approximately one-half the bit period. The information is transmitted over the transmission lines as succeeding adjacent bits as a series of bi-polar signals separated by short quiet periods between the second polarity pulse and the generation of the subsequent initial pulse. Each pulse is detected and a relatively square wave signal generated by a suitable logic threshold detector. The leading edge of the pulse is employed to fire a timing pulse generating means such as a one-shot retriggerable unit to generate a timing pulse defined as a pre-clock pulse of approximately one-half period of the first interval. The trailing edge of the preclock pulse, in turn, fires a longer timed pulse generating means such as a retriggerable one-shot unit having a timing period equal to approximately one-half the total time of the bit period. The output of this second timing circuit provides the clock signal associated with the data. The output of the clock pulse means is in a particularly novel and optimum construction also connected to the pre-clock pulse generating means and to the receiver to positively inhibit further signal formation by these latter two elements. Thus, it positively prevents the receipt of the second pulse of the bi-polar signal, thereby eliminating the necessity of waiting for the transmission of such pulse. It also inhibits the recognition of signals on the received lines during which period erroneous noise or other erroneous information may appear on the line and tend to cause malfunctioning.

In the present invention, the clock pulses derived from the polarity pulse continue to operate the system for proper transmission of the successive bits of a message frame as long as at least one pulse per time period is generated. Thus, both of the bi-polar portions of the pulse are effective to provide a pulse source for generating of the necessary clock signal as well as the other related signals, to ensure the continued transfer of successive bits in each frame.

If the second pulse of the bi-polar signal is lost for any reason such as noise, there is no affect on the system as this pulse is not employed in the normal transmission, based on the first pulse convention. If the first pulse of the bi-polar signal, however, is lost, the received data may be in error. However, the processing circuitry as shown in the previously identified Buchanan et al application or system may include a parity check on the received data which would indicate such failure.

Thus, the data transmission system will be in operation as long as either pulse is generated, though the data as such may be erroneous.

The present invention has been found to provide a simple, reliable and relatively inexpensive means and apparatus for high speed digital signal transmission and readily accommodates transmission of digital information in the order of 500,000 bits per second, with each bit automatically providing interlocking control and with the necessary timing, data validating and interlocking signals to ensure the integrity of processing of the total message frames.

BRIEF DESCRIPTION OF THE DRAWING

The drawing furnished herewith illustrates a preferred construction of the present invention in which the above advantages and features are clearly disclosed as well as others which will be readily understood from the subsequent description of such illustrated embodiment.

In the drawing.

DESCRIPTION OF THE ILLUSTRATED EMBODIMENT

Figure 1:
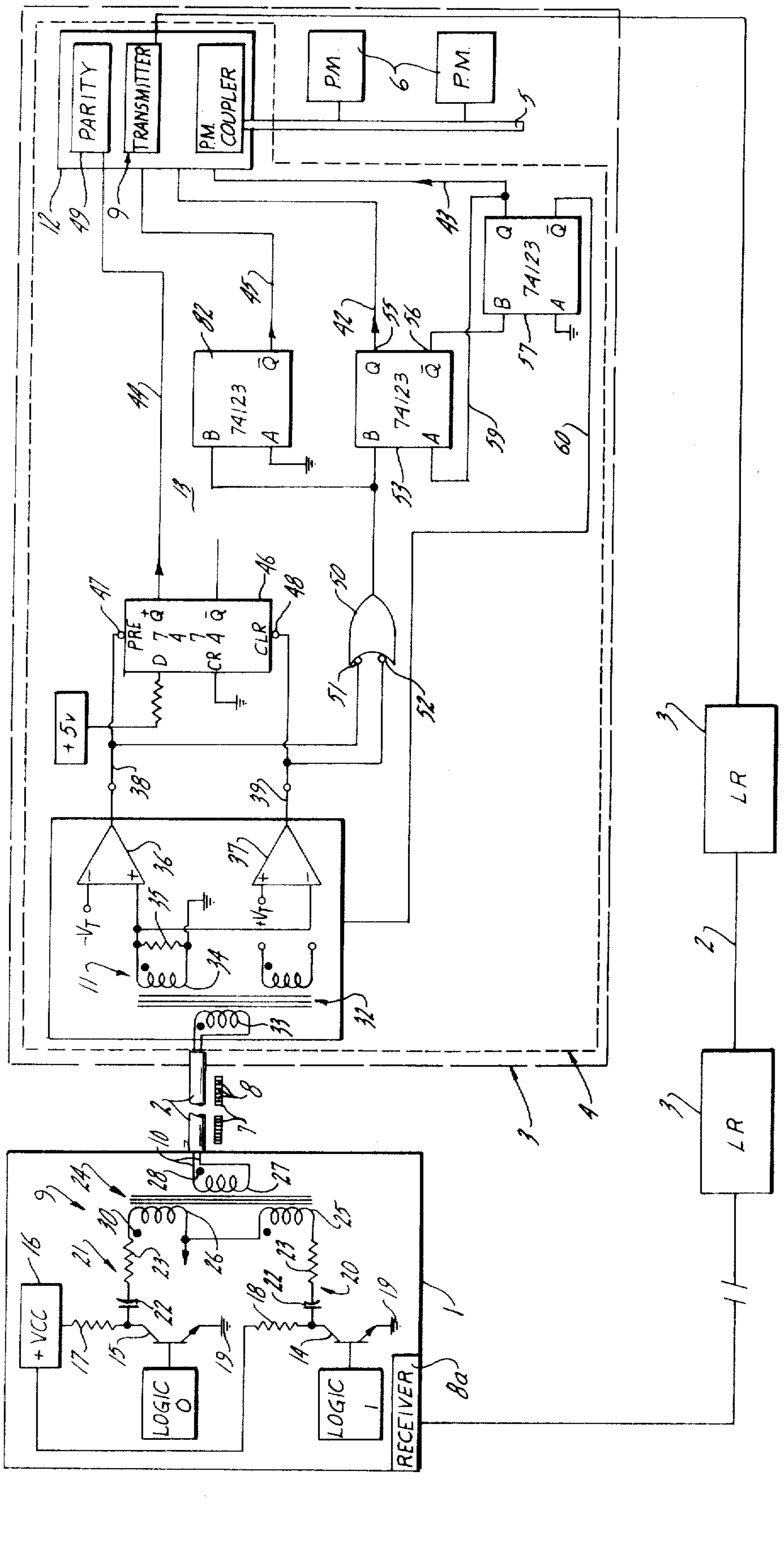
FIG. 1 is a schematic illustration of a loop communication system employing digital bi-polar transmission signals, with a pulse detection and conversion system constructed in accordance with the present invention.

Referring to the drawing, the present invention is shown in connection with a data communication loop system employing a loop controller 1 serially coupled by a loop communication cable 2 to a plurality of similarly constructed remote stations 3, generally as more fully disclosed in the previously referred to Buchanan et al. application. Each of the remote stations 3 generally includes a message frame handling means 4 coupled via a common bus cable 5 which is connected to a cable 2 to receive and retransmit the message frames. The frame handling means 4 selectively transmits information to the several point modules 6 from a message frame 7. Thus, the central controller 1 generates message frames 7, each of which includes a plurality of digital logic bits 8. The frames 7 are circulated in serial fashion throughout the loop to establish communication with the remote stations 3 in a selected manner.

Each of the point modules 6 include similar logic means for receiving the information from the message frame 7 and processing the information to provide for the selected operation of operating hardware or other load means such a set point adjustment, checking the status of the hardware and/or receiving information from the hardware. For example, the system may be adapted to read an analog output of a temperature sensor. Alternatively, the point modules 6 may control the start-stop motor controls with sensing of the status of the motor operation.

The message frames 7 are divided into a plurality of bit subgroups to provide for selective addressing of the remote station 3, a point modules 6 as well as the particular load means and function as more fully disclosed in the Buchanan et al application.

The present invention is particulary directed to the apparatus for generating and transmitting of a binary logic signal for each bit with one transmitter means and one receiver means shown in detail in the drawing.

Each bit 8 of a message frame 7 is a bi-polar signal which, of course, originates at the loop controller 1 and particularly a bi-polar signal generator 9 connected to cable 2, which is a suitable twisted pair of lines or a coaxial line. Cable 2 is shown simply including a pair of transmission wires or lines 10. Each binary bit 8 is thus transmitted as a bi-polar or alternating pulse having both a positive half-cycle pulse and a negative half-cycle pulse, with the binary logic "1" and logic 0related to correspondingly have the initial pulse or positive polarity or negative polarity. The frame handling means 4 of the remote station 3 includes a data receiver 11 to receive the bi-polar bit signal, properly process the bit for action by a point module 6 if required, and retransmit it via a data transmitter 12 in either modified or unmodified form. The present invention is particularly directed to the initial processing of the signal by a timing an clock signal forming means 13 connected to the receiver 11. If the data frame 7 is to be employed by the corresponding remote station 3, each bit 8 is coupled to the appropriate point module 6, properly modified, and retransmitted by transmitter 12 through the following loop cable 2 to a receiver at the next station 3 and finally to a receiver **8*a* at the loop controller 1 where the modified message frame 7** is interpreted and necessary subsequent action taken, if any.

Although the data transmitters 9 and receivers 11 can be of any suitable construction a particularly satisfactory unit is shown in FIG. 1.

More particularly, the transmitter 9 includes a pair of logic transistors, identified as a logic "O" transistor 14 and a logic 1 transistor 15. The transistors 14 and 15 are normally cut off to create a zero voltage level or quiet period on cable 2. A logic input signal is applied to the base of the appropriate transistor 14 – 15 in accordance with the desired logic signal to be generated.

Each of the transistors 14–15 is similarly connected to a positive power supply 16 through a related load resistor 17 and 18 to selectively connect a common ground 19 to end of one resistor 17–18. A similar differentiating network 20 and 21 each of which similarly includes a capacitor 22 in series with a damping resistor 23, one connected to the differentiating networks 20 and 21. A pulse transformer 24 includes a pair of windings 25 and 26 connected with a common center return 27, between the differentiating networks 20–21. The respective capacitors 22 through charge through the associated load resistors 17 and 18. When a transistor 14 or 15 is biased on, the corresponding capacitor discharges through the associated primary winding 25 or 26. The pulse transformer windings 25 and 26 with the two transistors selectively establish an opposite flux flow through a related winding 27. The windings 25 – 27 are appropriately wound on a common core and thus generate oppositely directed flux which in turn generate a related signal in the common transmitting winding 27 which is connected directly to the transmission lines 10. Thus, when transistor 14 is biased on, a related polarity signal in the secondary winding 27, as shown by the illustrated polarity dots 28 is created. The signal is an alternating or bi-polar signal as shown typically at 29 in FIG. 2, with the dot illustration corresponding to the first half cycle or pulse in the signal.

When the opposite transistor 15 is triggered, the polarity of winding 26 is similarly shown by dot 30 but winding 26 is wound to reverse the relative polarity in winding 27 with generation of a bi-polar or alternating pulse signal of opposite phase. For example, as shown diagrammatically at 31 in FIG. 2.

The bi-polar pulse signals 29 and 31 are transmitted by the transmission lines 10 which are preferably of a low impedance characteristic and generally of the order of 50 ohms. Thus, each logic bit includes the initial bi-polar pulse signal generated by the switching of the logic transistors 14 or 15 on and off followed by a dwell quiet time to define a complete period for each bit. In a practical system employing a 500,000 bit per second system, each bit may include a total period of 2 microseconds with the initial polarity pulse of each signal assuming an initial period of essentially 0.5 microseconds and with the opposite polarity employing a similar period followed by a zero or quiet period of approximately one microsecond. The binary bit signal may be transmitted over the transmission lines and if a total 2,000 foot line 10 is employed in approximately one and one-half microseconds. Thus the time between the initial generation of each bit 8 and the receipt of the bit at an adjacent station is approximately 3-½microseconds for 2,000 feet of cable. The circuitry starts the clock within 200 ns after the receipt of the leading edge of the pulse. Assuming there are no cable delays, the data will be ready for processing 200 ns after it was transmitted.

The bi-polar signals 29 and 31 are received and transmitted by a coupling transformer 32 having a single primary winding 33 connected directly to the signal lines 10 and having an isolated secondary winding 34 with a parallel damping resistor 35. The transformer 32 may correspond to transformer 24 with only one of the two similarly constructed windings employed as the secondary 34. The low impedance characteristic of the transmission line system in combination with the transformer coupling permits transmission with direct current signal isolation and a high degree of noise immunity even though the transmission is unbalanced. Thus, this system has been applied to reliably transmit order of 500,000 bits per second, with distances between the transmitter and receiver of the order of 2,000 feet. Further distances can be created, of course, by introducing of additional combinations of transmitter 9 and receiving transforming pairs at a given remote point, either at a remote station 3 or at a special coupling station, not shown. The data receiver 11 further converts each corresponding bi-polar signal into a corresponding logic signal by response to the first polarity pulse.

Figure 2:
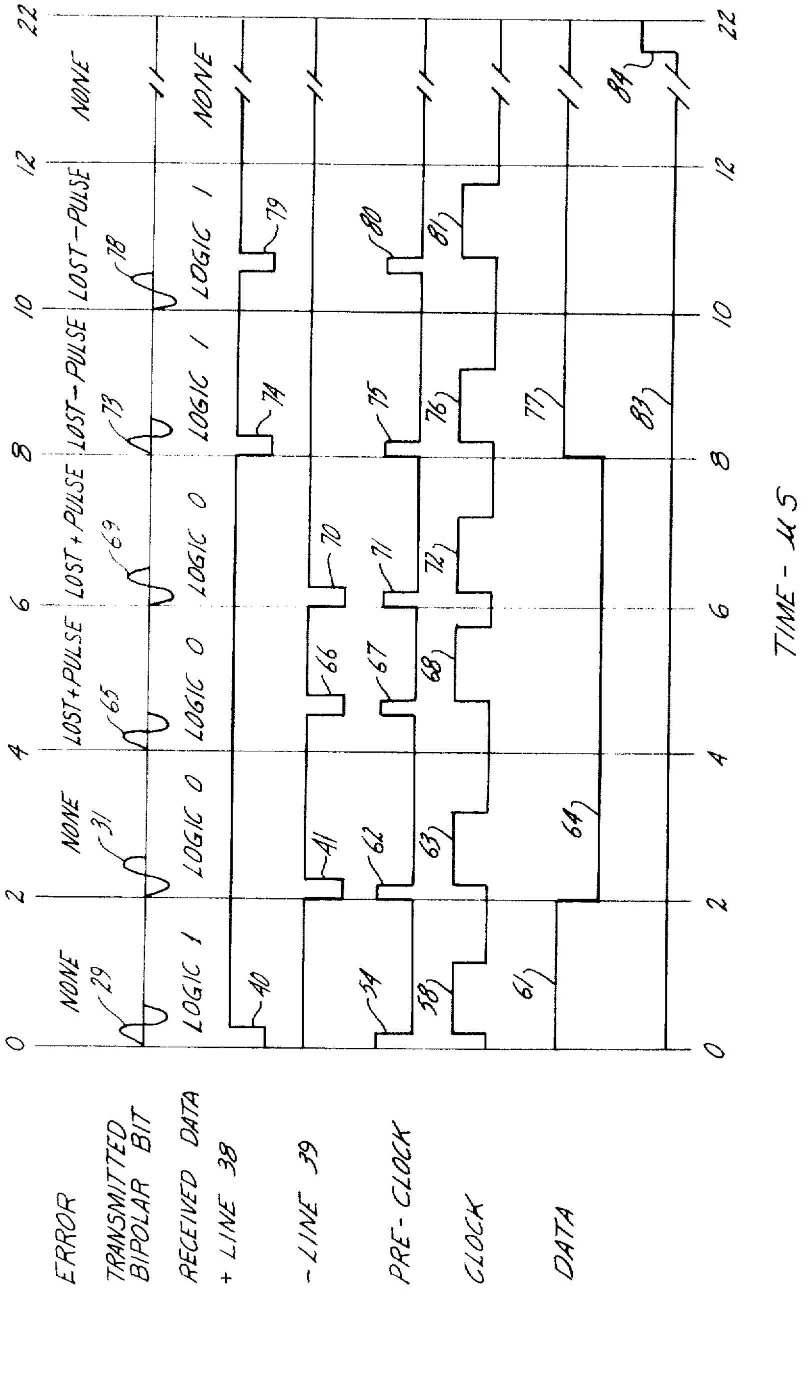
FIG. 2 is a typical receiver timing illustration showing the received signals and the interrelated pulse signals generated under varying conditions of proper and erroneous data received.

The transformer secondary 34 is connected to a pair of polarity detectors 36 and 37, which have a selected positive and negative threshold voltage level. The detectors 36 and 37 are diagrammatically shown as operational amplifiers having inverting and non-inverting inputs connected appropriately to a positive voltage reference which is compared to each pulse of the alternating signals 29 and 31. Thus each alternating pulse will activate both of the detectors 36 and 37. The positive or logic 1 signal 29 received results in a generation of a square wave pulse 40 shown in FIG. 2 at the positive voltage detector line 38 and then a similar square wave pulse, not shown, at the negative voltage detector line 39. The logic 0 signal 31 will first trigger the negative voltage detector 37 to generate a pulse 41 as shown in FIG. 2, and then and immediately thereafter activate the opposite polarity detector 36 to generate a corresponding positive pulse signal, not shown, at the opposite voltage output output line 38.

In accordance with the present invention, the received signals 29 and 31 are processed through a novel conversion circuit 13 to produce the necessary pulse processing signal directly from each bit to analyze the same bit and retransmit it, either modified or unmodified. In the illustrated embodiment each received bit 8 is processed to generate a pre-clock pulse at a preclock signal line 42 for proper timing within frame handling means 4 and other related processing hardware, a clock pulse at a clock line 43 to ensure continued transmission of the successive data bit at a serial data transmission line 44, and finally a clear signal at a clear line 45 to reset the frame handling means 4 and other related reprocessing hardware for receipt of a subsequent message frame 7. Thus, the time related and independent signals on the two data receiver lines 38 and 39 are interconnected to yield the necessary pulsing signals directly. These signals at lines 42 - 45 can then be assembled or employed with any of the relatively well-known techniques to assemble the serial data material at line 44 for selectively transmitting and grouping for processing and modification within a remote station 3 or for directly retransmitting of the bit unmodified to the next remote station 3, without the necessity of auxiliary sources of clocking and timing devices. Each bit 8 is immediately transmitted, modified or unmodified.

More particularly, in the illustrated embodiment of the invention, the polarity related lines 38 and 39 are connected to a data register 46, shown as a conventional integrated Ser. No. 7,474 flip-flop circuit. The register 46 includes a first set terminal 47 connected to the positive polarity receiver lines 38 and responsive to a positive polarity signal to set line 44 at a positive logic 1. The negative polarity line 39 is connected to the clear terminal 48 of register 46 and will establish a corresponding low level or logic 0 at the serial data line 44. This information is properly processed in response to the clock and timing signals as well as parity checking in any suitable or known parity check unit 49 forming a part of the handling means 4.

The signals at lines 42, 43 and 45 are generated as follows. Both of the negative and positive polarity lines 38 and 39 are connected as one of the inputs to a logic OR circuit or gate 50 having a pair of inverting inputs 51 and 52 such that a logic 0 at either input generates a logic 1 output. The output of the logic gate 50 is connected to a pre-clock pulse generator 53, such as a retriggerable one-shot Ser. No. 74123 integrated circuit unit. The leading edge of either a pulse on the polarity lines 38 and 39 will simultaneously set the flip-flop circuit 46 and activate the one-shot unit 53. The latter is selected to have a relative short time period and particularly a period which is significantly less than that of the activating pulse period. For example, where the polarity pulse is of a 500 nanosecond period, the one-shot unit 53 may generate a pre-clock pulse of approximately 200 nonoseconds as shown at 54 in FIG. 2. This produces a corresponding pre-pulse signal at the pre-clock line 42 which is connected to positive output 55 of the circuit 53, for initiating the timing of the data processing period.

The trailing edge of the pre-clock pulse 54-(FIG. 2) is employed to further generate the desired block pulse and interlocking signals, as follows.

The not-output 56 of the one-shot unit 53 is connected as an input to a second pulse generator 57, also shown as a one-shot integrated circuit, the positive output of which is connected to the clock line 43. Thus, the clock line 43 will rise to a logic 1 level at the negative edge of the pre-clock pulse, as shown in FIG. 2, to define the clock pulse 58.

The clock output pulse 58 is also fed by an inhibit line 59 to the second or inhibit input of the pre-clock pulse generator 53 and positively holds circuit off. This ensures that a single pre-clock timing pulse 54 is generated for each clock pulse 58 generated.

Further, the not-output of the clock unit 57 is connected by an inhibit signal line 60 to the data receiver 11. The not output pulse of clock 57 prevents reception of the second half-cycle of the logic 1 bi-polar signal 29 (FIG. 2). Thus, only the pulse 40 is generated and transmitted by the receiving circuitry. Consequently, the circuitry does not have to delay its functioning during the time that such negative pulse would otherwise be received and in particular avoids the necessity of a delay of 500 to 700 nanoseconds during which the opposite polarity pulse exists. The inhibiting of the receiver 11 also positively prevents the transmission of any other extraneous information or noise which may exist on the transmission lines 10. If such extraneous information does exist, data receiving means simply ignores the signals.

In FIG. 2, the transmission characteristic is illustrated for six successive bits, each of a two microsecond duration as shown by the time scale and illustrating the various conditions including errors which may be encountered by a remote station 3 and the related pulse signals generated thereby.

The error conditions are appropriately identified along the corresponding logic time column for the successive bits which were transmitted and decoded at the serial data line 44 for retransmission. Thus, the first time column includes a proper transmission condition for the logic 1 signal 29 which is properly decoded and retransmitted as a logic 1 signal as shown by the alleged data line 61 which is at a relatively high voltage level for the 2 microsecond bit interval. This signal will be properly processed by the remote station 3 and retransmitted as a logic 1 or modified and retransmitted as a logic 0 in accordance with the encoding of the message frame 7. The first column thus illustrates the several pulse signals as discussed in the description of the circuit of FIG. 1.

The second time column illustrates a proper condition transmission for the logic 0 signal 31, with the decoding and retransmission at the serial data line 42 as a proper logic 0 signal, shown by the decrease in the signal level of data line 64.

Under these conditions, the bi-polar signal 31 received first generates the negative half-cycle which in turn generates the first pulse 41 at the negative polarity signal line 39 of the receiver detector 37 to generate a corresponding pre-clock pulse 62 at the pre-clock line 42 as a result of the actuation of the OR gate 50. The related trailing edge of the pre-clock pulse 62 activates the clock pulse generator 57 to generate a clock pulse 63. This simultaneously activates the inhibit signal lines 59 and 60 to prevent reception of further signals including the positive half-cycle of pulse 31 and to inhibit the pre-clock unit 53. The serial data line 44 has been converted to a logic 0 approximately in synchronism with the generation of the leading edge of the pre-clock pulse 62 by the signal applied to terminal 48 of unit 46, and thus the serial data is properly transmitted and decoded as a logic 0 as at 64.

In the third column, an error condition is shown associated with a transmitted logic 1 bi-polar signal 65 and in particular where the positive pulse portion has been lost. Thus, the logic 1 signal does not activate the positive polarity detector 36 as it should to generate a pulse signal at line 38 which is shown in FIG. 2 by the continuing zero output. Each half of each bi-polar pulse is operative unless inhibited, and the negative pulse of the logic 1 signal 65 is therefore detected by the negative polarity detector 37 to establish the related pulse signal 66. The second pulse of the bi-polar signal 65 therefore creates a pre-clock pulse 67 and an associated clock pulse 68 in the same manner as previously described but delayed by the period of a bi-polar pulse.

Consequently, as a result of the lost pulse and the loss of the inhibiting signal, the second polarity signal is transmitted and also activates the data unit 46. Consequently, the serial data line 44 is established, or held, at the logic 0 level, as shown in FIG. 2. This is an erroneous piece of information which is being transmitted through the system. However, the parity check unit 49 will detect the creation of the erroneous information and prevent execution of a command or instruction contained in the message for a frame. Thus, in the system based on the previous description, the frame 7 inactivates the station hardware and converts a frame bit 8 to indicate a parity error which is transmitted to the controller 1. The generation of the clock signal 68 ensures the retransmission of the admittedly erroneous information through the subsequent loop system and particularly back to the loop controller 1 where proper action can be taken.

The fourth time column illustrates a condition where the positive polarity pulse has been lost in a logic 0 transmitted signal 69. As the logic 0 signal is dependent upon the negative pulse and the related output of the negative pulse detector which establishes a proper signal 70 at the negative polarity output line 39 to correspondingly generate the preclock signal 71 and clock signals 72 and with the serial data properly transmitted as a logic 0. Thus, the loss of the subsequent positive polarity pulse does not affect the system as it is not, in fact a data type error.

In the next or fifth time column, a logic 1 bi-polar signal 73 was transmitted, in which the negative polarity pulse was lost and the detector output remains at null. This is the reverse of the previous situation. The positive polarity detector 36 has responded to the first positive polarity pulse of the incoming bi-polar signal 72 to generate the data signal 74 with a pre-clock signal 75 and a clock signal 76 with the resulting proper information transfer as a logic 1 as at 77. Thus, the negative cycle and related negative polarity pulse is not operative for a properly transmitted logic 1, and, consequently, its loss has no effect or consequence.

In the sixth time column, the negative polarity pulse lost condition for a logic 0 bi-polar signal 78 has been received. The loss of the negative pulse in this condition results in an improper transmission by failure to establish a signal at line 39 and the activating of circuit 13.

The subsequent positive pulse, however, activates the positive polarity detector 36, with the appropriate output signal 79 at the line 38. This triggers the serial data flip-flop circuit 46 to improperly transmit the signal via serial line 44 as a logic 1. However, this positive polarity related signal 79 also generates the necessary pre-clock signal 80 and clock signal 81 at the lines 42 and 43 to transmit the erroneous data bit 8. The erroneous nature of the data will again be readily detected by the parity check unit 49 and a commanded execution prevented, as well as an activated parity bit being carried by the message frame 7 back to the loop controller 1 for the necessary response and processing.

Thus, each of the message frame bits 8 as received is serially processed, with each bit automatically generating the necessary timing and clock pulses to produce the desired transfer. Further, through the inhibiting and lock-out circuitry, the malfunctioning due to noise, erroneous signals and the like is essentially eliminated.

In addition, the illustrated circuit automatically generates the necessary clear signal to reset the frame handling means 4 for subsequent receipt of a new frame 7. Thus, the output of the OR gate 50 is also connected to one input of a clear signal timing means or generator 82, also shown as a one-shot unit with the clear output signal line 45 connected to the not-output. The clear signal generator 82 is provided with a substantially longer timing period, such as an eight micro-second time period. Consequently, as long as a pulse signal is established on either the positive or negative receiver lines 38 and 39 so as to generate the pre-clock pulse, the resettable one-shot unit 82 is set to maintain the not-output at a logic 0 level at the clear line 45, as illustrated at 83 in FIG. 2. Once the complete message frame 7 has been processed by the remote station 3, a quiet period of 10 microseconds is introduced into the system by the circuitry of the loop controller 1 which spaces the frames 7 by at least 10 micro-seconds. The clear signal resettable one-shot unit 82 will, therefore, after approximately eight microseconds, reset and generate a logic 1 signal at its not-output and the connected clear line 45, as shown at 84 in FIG. 2. This provides the necessary clear signal for resetting of the system to permit the subsequent receipt of a new message frame 7.

The present invention thus provides a continuous generation of the necessary control pulse such as the timing, clocking and clearing signal pulses for each bit as a result of the receipt of a bi-polar bit signal, particularly either polarity pulse of the bit signal. In this manner, the necessity for separate synchronizing means, scanning means or the like to monitor the message information is eliminated while permitting rapid or high speed digital signal transmission.

Various modes of carrying out the invention are contemplated as being within the scope of the following claims, particularly pointed out and distinctly claiming the subjet matter which is regarded as the invention.

I claim:

1. A digital signal transmission apparatus employing bi-polar bit signals having a first polarity pulse and a second opposite polarity pulse for each information bit, the improvement in a control pulse generating means for processing a bi-polar bit signal comprising a receiving means having an input for receiving the bi-polar bit signal and generating a correspondingly related polarity signal in response to the receipt of each pulse of the generated bipolar a bit signal, means to select the first of said pair generated opposite polarity pulses as the data information, a pulse forming means connected to said receiving means for generating a pulse output in response to the receipt of the pulse of said generated bipolar bit from said receiving means and connected to initiate transfer said generated bi-polar bit signal.

2. The digital signal transmission apparatus of claim 1 wherein each of said bi-polar bit signals has a predetermined bit period and said pulse forming means includes a pre-clock timing means establishing a first preclock pulse of a period substantially less than the bit period, said preclock pulse having a leading edge and a trailing edge, and a clock timing means connected lo said pre-clock timing means and activated by the trailing edge of said pre-clock pulse of said pre-clock timing means, said clock timing means having a clock output defining a clock pulse for controlling transfer of said corresponding bi-polar bit signal.

3. The digital signal transmission apparatus of claim 1 having an inhibit means interconnecting the output of the pulse forming means to the receiving means to inhibit receipt of further information during the period of the pulse output of the pulse forming means.

4. The digital signal transmission apparatus of claim 2 having said clock output connected to said preclock timing means to inhibit operation of said pre-clock timing means during the period of the clock pulse.

5. The digital signal transmission apparatus of claim 1 having a clear timing means connected to the pulse forming means and generating a logic clear signal a predetermined quiet time after the creation of pulse output by said pulse forming means.

6. The digital signal transmission apparatus of claim 5 having a plurality of adjacent bit signals grouped to define message frames separted by quiet periods, and said clear timing means being operative upon the termination of a message frame and during the quiet period between successive message frames to time out and generate a clear signal to reset the apparatus for subsequent processing of a succeeding message frame.

7. The apparatus of claim 1 including a transmission system comprising a transmitter having a pair of logic switches one responding to a first polarity pulse, and the second of which responds to a second polarity pulse connected to generate a pulse signal in response to a binary logic signal, a single differentiating transformer network coupling each of said logic switch outputs to one of the transmission lines to produce one of said bi-polar bit signals, said receiving means further including a transformer coupled to said transmission lines and a positive voltage detector and a negative voltage detector connected in common to the output of said transformer and responsive to said bi-polar bit signal to generate pulses on a related positive pulse signal line and a negative pulse signal line.

8. A digital signal transmission apparatus employing bi-polar bit signals for each information bit, the improvement in the control pulse generating means for processing of the bit signal comprising a receiving means having an input for receiving the bi-polar signal having a pair of signal lines having polarity related signals generated by the receiving means, for each polarity of the bi-polar signal, a data storage means coupled to the receiving signal lines and establishing a correspondingly related output data signal in accordance with the first polarity pulse of the bi-polar bit signal, a pre-clock timing means having a pair of inputs connected to both of said signal line means and generating a pulse output in response to the first incoming pulse on said lines, said timing means generating a pulse having a time period less than the total time period of a bi-polar bit signal, a clock timing means connected to said pre-clock timing means and activated by the trailing edge of said output of said pre-clock timing means, said clock pulse means having an output defining a clock pulse for transfer of said corresponding bit signal, an inhibit means interconnecting the output of the clock timing means and to the receiving means and to the preclock timing means to inhibit the receiving means and the preclock timing means during the period of the clock pulse.

9. The digital signal transmission apparatus of claim 8 wherein said apparatus encodes a plurality of information bits into time spaced message frames having preselected quiet periods between the successive message frames, and having clear timing means having a reset input means connected to the output of the pre-clock timing means and generating a logic clear pulse a predetermined time after reset, said clear timing means responding to the termination of a message frame and the quiet period between successive message means to time out and generate a clear signal to reset the apparatus for subsequent processing of a message frame.

10. The apparatus of claim 9 wherein the clear timing means is a resettable one-shot circuit having a time out period less than the quiet period between message frames but significantly longer than the timing period of each logic bit.

11. The apparatus of claim 8 wherein the pre-clock timing means is a one-shot circuit having a timing period substantially less than the total period of a bi-polar signal.

12. The apparatus of claim 8 wherein said clock timing means is a one-shot circuit having a positive output and a not-output, said clock timing means having a timing period significantly greater than the first timing means but less than the time period of the bi-polar signal following such pre-clock timing means, the positive output of said clock timing means constituting a clock output signal and being interconnected to the pre-clock means to inhibit the subsequent operation and said not-output being interconnected to the receiving means to inhibit the receiving means.

13. The apparatus of claim 8 wherein the pre-clock timing means is a one-shot circuit having a timing period essentially corresponding to one-quarter of the total period of a bi-polar signal, said clock timing means is a one-shot circuit having a timing period significantly essentially corresponding to one-half the period of a bi-polar signal.

14. The apparatus of claim 13 wherein said clock one-shot circuit has a positive output and a not-output, the positive output of said clock one-shot circuit constituting the clock output signal and being interconnected to inhibit the subsequent operation of the pre-clock one-shot circuit, said not-output being interconnected to the receiving means to inhibit the receiving means.

15. The digital transmission apparatus of claim 13 wherein said apparatus encodes the information bits into time spaced message frames having preselected quiet periods between the successive message frames, and having a resettable one-shot circuit having a time out period less than the quiet period between message frames but significantly longer than the timing period of each logic bit, said resettable circuit having a reset input means connected to the output of the pre-clock timing means and generating a logic clear pulse a predetermined time after reset, said timing means being operative upon the termination of a message frame and during the quiet period between successive message means to time out and generate a clear signal to reset the apparatus for subsequent processing of a message frame.

16. The apparatus of claim 15 including a transmission system including a transmitter having a pair of opposite polarity logic switches connected to apply a pulse signal in response to its binary logic input signal, a single differentiating transformer network connecting outputs of each of said logic switches to one of the transmission lines to produce a bi-polar signal, said transmission system including a receiver including a transformer coupled to said transmission lines and a positive voltage detector and a negative voltage detector connected in common to said transformer and responsive to said bi-polar signals to establish a related positive pulse signal and a negative pulse signal in immediate time sequence.

17. A digital signal transmission apparatus employing bi-polar signals having a first polarity pulse and a second opposite polarity pulse for each information bit, the improvement in a control pulse generating means for processing each of said bit signals comprising a receiving means having an input for receiving each bi-polar signal and generating a pair of corresponding related polarity signals in response to each bi-polar bit signal and having means to select only a predetermined one of each of said pair of opposite polarity signals as the data information, a pulse forming means connected to said receiving means and generating a control pulse output in response to an incoming pulse of said generated bi-polar bit signals from said receiving means and connected to initiate a transfer of said generated bi-polar bit signal.

* * * * *

UNITED STATES PATENT OFFICE
CERTIFICATE OF CORRECTION

Patent No. 3,798,608 Dated March 19, 1974

Inventor(s) THOMAS W. HUEBNER

It is certified that error appears in the above-identified patent and that said Letters Patent are hereby corrected as shown below:

Column 1, Line 15, after "voltage" delete "signal" and insert --- signals ---;

Column 4, Line 10, after "such" delete "a" and substitute --- as ---;

Column 4, Line 19, after "point" delete "modules" and insert --- module ---;

Column 4, Line 34, after "logic" (second occurrence) delete "Orelated" and insert --- "0" related ---;

Column 5, Line 5, after "22" delete "through" and insert --- thus ---;

Column 6, Line 25, after "voltage" cancel "output";

Column 6, Line 34, after "processing" delete "hardward" and insert --- hardware ---;

Column 7, Line 15, after "200" delete "nonoseconds" and insert --- nanoseconds ---;

Column 7, Line 21, after "desired" delete "block" and insert --- clock ---;

Column 10, Line 21, after "bi-polar" cancel "a";

Column 10, Line 22, before "generated" insert --- of ---;

FORM PO-1050 (10-69)

USCOMM-DC 60376-P69
☆ U.S. GOVERNMENT PRINTING OFFICE : 1969 O—366-334.

UNITED STATES PATENT OFFICE
CERTIFICATE OF CORRECTION

Patent No. 3,798,608 Dated March 19, 1974

Inventor(s) THOMAS W. HUEBNER

It is certified that error appears in the above-identified patent and that said Letters Patent are hereby corrected as shown below:

Column 10, Line 26, after "the" and before "of" delete "pulse" and insert --- pulses ---;

Column 10, Line 36, after "connected" delete "lo" and insert --- to ---;

Column 12, Line 52, after "bi-polar" and before "signals" insert --- bit ---;

Column 12, Line 57, after "of" cancel "corresponding" and insert --- correspondingly ---;

Signed and sealed this 24th day of September 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69